United States Patent Office 2,870,148
Patented Jan. 20, 1959

2,870,148

HETEROCYCLIC AMIDES OF N ARALKYL PIPERIDINE CARBOXYLIC ACIDS

Joseph Sam, De Witt, N. Y., assignor to Bristol Laboratories Inc., Syracuse, N. Y., a corporation of New York No Drawing. Application January 23, 1957
Serial No. 635,616

6 Claims. (Cl. 260—247.5)

This invention relates to a new class of compounds useful in the therapy of hypertension, e. g. to lower blood pressure, or reduce other symptons such as headache, and more particularly to certain heterocyclic amides of certain N-aralkyl-substituted-piperidinecarboxylic acids.

There is provided by the present invention a compound selected from the group consisting of a free base and non-toxic acid addition salts thereof, said free base having the formula

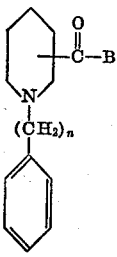

wherein $n$ is an integer from one to three inclusive and B is a member selected from the group consisting of morpholino, 2,6,-dimethylmorpholino, piperidino, pipecolino and pyrrolidino.

The non-toxic acid addition salts included in this invention comprise salts of organic and inorganic and mineral acids such as hydrochloric, sulfuric, nitric, phosphoric, sulfamic, hydrobromic, hydriodic, tartaric, glycolic, citric, maleic, succinic, acetic, benzoic, cinnamic, mandelic, malic, ascorbic and the like. The method of preparation of these salts is apparent from the examples below and consists of the addition of one equivalent of acid to one equivalent of free base.

The products of the present invention are prepared by catalytic hydrogenation, e. g. at 60 lbs./in.² and 50° C. in water in the presence of $PtO_2$, of a quaternary compound having the formula

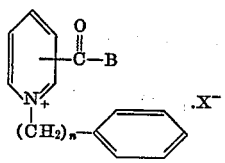

wherein $X^-$ represents a halide ion and $n$ and B have the same meaning as above.

The quaternary compounds to be hydrogenated are prepared, for example, according to the following reaction scheme:

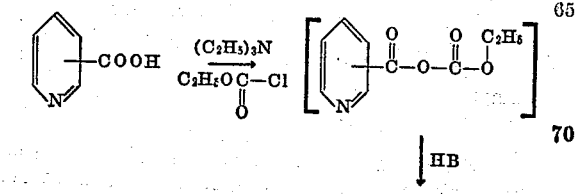

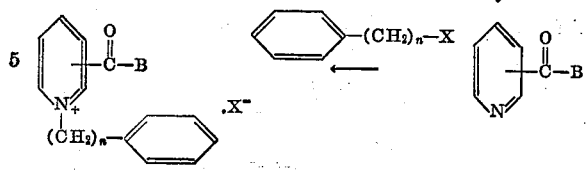

wherein $n$, B and X have the same meaning as above.

The following examples are given to illustrate the scope of this invention without limiting it thereto.

EXAMPLE 1

2 - (4 - morpholinocarbonyl) - 1 - β - phenethyl-piperidine

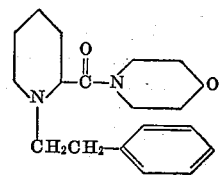

To a stirred and cooled mixture of picolinic acid (0.2 mole, 25 g.) and 500 ml. methylene chloride, triethylamine (0.2 mole, 20.2 g.) was added gradually. The resulting clear solution was kept at 0°–3° C. while ethyl chloroformate (0.22 mole, 21 ml.) was added dropwise with stirring over about 15 minutes. While maintaining the temperature at 0°–3° C. throughout, the mixture was stirred for 30 minutes and then morpholine (0.2 mole, 17.4 g.) was added dropwise. After warming to room temperature, the mixture was washed with 300 ml. water and the methylene chloride phase was separated, dried over anhydrous potassium carbonate and distilled to give 26 g. 4-(2-pyridinecarbonyl)-morpholine, also called 2-morpholinocarbonylpiperidine, B. P. 140°–144° C./0.6 mm. M. P. 72°–76° C.

A solution of 2-morpholinocarbonyl-pyridine (0.182 mole, 35 g.) and β-phenethyl bromide (0.2 mole, 37 g.) in 100 ml. acetonitrile was heated to reflux for 20 hours and the solvent was then removed by distillation in vacuo to leave as the residual oil the desired 2-morpholinocarbonyl-1-β-phenethyl-pyridinium bromide. This oil was dissolved in 200 ml. water and extracted with ether. The aqueous phase was then hydrogenated at 59 lbs./in.² in the presence of 0.4 g. $PtO_2$ catalyst over 24 hours. After removal of the catalyst by filtration, the filtrate containing 4-(1-β-phenethylpipecolinoyl)-morpholine hydrobromide was neutralized with 40% sodium hydroxide and extracted with ether. The ethereal extract was dried over anhydrous potassium carbonate and the ether removed by distillation to leave 11 g. residual oil from which there was obtained by distillation 9 g. 4-(1-β-phenethylpipecolinoyl) morpholine, also called 2-(4-morpholinocarbonyl)-1-β-phenethylpiperidine, B. P. 192°–195° C./0.4 mm., $n_D^{24°}$ 1.5426.

Calc'd for $C_{18}H_{26}N_2O_2$: C, 71.48; H, 8.67. Found: C, 71.9, 71.5; H, 8.88, 8.64.

EXAMPLE 2

2 - α - pipecolino - carbonyl - 1 - β - phenethylpiperidine

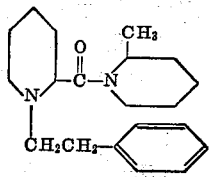

This compound is produced by carrying out the procedures set forth in Example 1 except that the morpholine is replaced by 20 g. α-pipecoline.

EXAMPLE 3

*3-(4-moropholinocarbonyl)-1-β-phenethyl-piperidine*

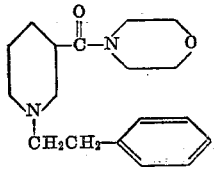

A mixture of nicotinic acid (2 moles, 240 g.), morpholine (2 moles, 180 g.) and 1200 ml. xylene was heated under reflux with stirring and automatic removal of water as formed. At the end of 20 hours, 20 ml. water had been collected and an additional 90 g. morpholine was added; the refluxing was continued for a total of 48 hours, collecting 41 ml. water. The solvent was then removed by distillation in vacuo. The residue containing the 4-nicotinoylmorpholine was washed with 10% aqueous sodium hydroxide, extracted with methylene chloride and the extract was dried over anhydrous potassium carbonate. Evaporation of the solvent followed by distillation gave 96 g. of 4-nicotinoylmorpholine, B. P. 130°–135° C./0.1 mm.

A solution of 4-nicotinoylmorpholine (0.14 mole, 27 g.), β-phenethyl bromide (0.2 mole, 37 g.) and 100 ml. acetonitrile was heated under reflux on the steam bath for 24 hours; on cooling the quaternary salt 3-morpholinocarbonyl-1-β-phenethyl-pyridinium bromide precipitated and was collected by filtration, washed with acetone, dried and found to weigh 47 g., M. P. 209°–211° C.

A sample from a similar experiment was crystallized from methanol-ether, M. P. 211°–212° C.

*Analysis.*—Calc'd for $C_{18}H_{21}BrN_2O$: C, 57.30; H, 5.61; Br, 21.18. Found: C, 57.6; H, 5.76; Br, 21.1.

A solution of this quaternary salt (0.164 mole, 62 g.) in 200 ml. water was hydrogenated at 58 lbs./in.$^2$ in the presence of 0.5 g. of $PtO_2$ for two days. After the catalyst was removed by filtration, the filtrate containing 3-(4-morpholinocarbonyl)-1-β-phenethylpiperidine hydrobromide was neutralized with 40% aqueous sodium hydroxide and extracted into ether. After drying over anhydrous potassium carbonate and evaporation of the ether, distillation of the residue gave 42 g. 4-(1-β-phenethylnipecotoyl)-morpholine, also called 3-(4-morpholinocarbonyl)-1-β-phenethylpiperidine, B. P. 190° C./0.2 mm.; $n_D^{34°}$ 1.5406.

*Analysis.*—Calc'd for $C_{18}H_{26}N_2O_2$: C. 71.48; H, 8.67. Found: C, 71.5; H, 8.67.

EXAMPLE 4

*3-piperidinocarbonyl-1-β-phenethyl-piperidine*

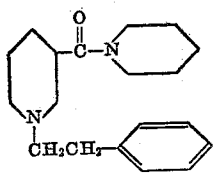

This free base is synthesized by replacing the morpholine in the procedure of Example 3 with 170 g. piperidine.

EXAMPLE 5

*3-(4-morpholinocarbonyl)-1-benzylpiperidine*

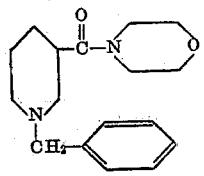

A solution of 4-nicotinoylmorpholine (0.2 mole, 38 g.) and benzyl chloride (0.2 mole, 35 g.) in 100 ml. acetonitrile was refluxed for 24 hours, cooled and diluted with ether to precipitate the quaternary salt, 3-morpholinocarbonyl-1-benzyl-pyridinium chloride, as an oil. After removal of the solvent by distillation in vacuo, this oil was dissolved in 200 ml. water and extracted with ether. The aqueous phase containing the quaternary salt was warmed on the steam bath to expel residual ether, cooled and hydrogenated overnight at 60 lbs./in.$^2$ at room temperature in the presence of 0.4 g. $PtO_2$ catalyst. After removal of the catalyst by filtration, the filtrate containing 3-(4-morpholinocarbonyl)-1-benzylpiperidine hydrochloride was neutralized with 40% aqueous sodium hydroxide and extracted with ether. After drying over anhydrous potassium carbonate, the ether was removed by evaporation and the residue was distilled to give 46 g. 4-(1-benzyl-nipecotyl)morpholine, also called 3-(4-morpholinocarbonyl)-1-benzylpiperidine, B. P. 183°–186° C./0.3 mm.

*Analysis.*—Calc'd for $C_{17}H_{24}N_2O_2$: C, 70.80; H, 8.39. Found: C, 71.0; H, 8.35.

EXAMPLE 6

*3-(4-morpholinocarbonyl)-1-γ-phenyl-propylpiperidine*

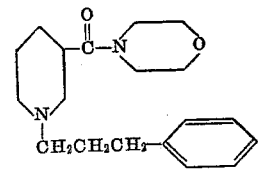

A solution of 4-nicotinoylmorpholine (0.2 mole, 38 g.) and 3-bromopropylbenzene in 100 ml. acetonitrile was refluxed for two days, cooled and diluted with ether to precipitate the quaternary salt, 3-morpholinocarbonyl-1-γ-phenylpropylpyridinium bromide. After the solvent was removed by distillation in vacuo, the residual oil was dissolved in 200 ml. water and extracted with ether. The aqueous phase containing the quaternary salt was hydrogenated at 60 lbs./in.$^2$ at 40° C. in the presence of 0.4 g. $PtO_2$ catalyst in about seven hours. After removal of the catalyst by filtration, the filtrate containing the product, 4-[1-(3-phenylpropyl) nipecotoyl]morpholine hydrobromide was neutralized with 40% aqueous sodium hydroxide and extracted with ether. The ether was dried over anhydrous potassium carbonate, and evaporated to leave a residue which on distillation gave 5 g. 4-[1-(3-phenylpropyl)-nipecotyl]morpholine, also called 3-(4-morpholinocarbonyl)-1-γ-phenylpropyl-piperidine, B. P. 202°–206° C./0.3 mm.

*Analysis.*—Calc'd for $C_{19}H_{28}N_2O_2$: C, 72.11; H, 8.92. Found: C, 72.3; H, 8.94.

EXAMPLE 7

*4-(4-morpholinocarbonyl)-1-β-phenylethyl-piperidine*

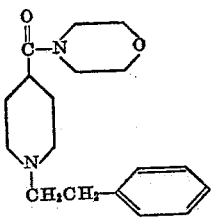

To a cooled solution of isonicotinic acid (1.5 mole, 185 g.) in 3 liters methylene chloride, there was added triethylamine (1.5 mole, 153 g.). While maintaining the temperature below —5° C. throughout the next steps, ethyl chloroformate (1.6 mole, 174 g.) was added dropwise with stirring. After stirring an additional 30 minutes, morpholine (1.6 mole, 139 g.) in 500 ml. methylene chloride was added gradually. The mixture was allowed to warm to room temperature, remained there over the week-end and was washed with a liter of water and then with 500 ml. 10% aqueous sodium hydroxide and dried over anhydrous potassium carbonate. Evaporation of the solvent followed by distillation gave 160 g. of 4-isonicotinoylmorpholine, B. P. 142°–145° C./0.4 mm.

A solution of 4-isonicotinoyl- morpholine (0.3 mole, 58 g.) and β-phenethyl bromide (0.3 mole, 56 g.) in 70 ml. acetonitrile was refluxed for 18 hours and cooled. Upon addition of 200 ml. acetone, 4-morpholinocarbonyl-1-β-phenethyl-piperidinium bromide crystallized out, was collected by filtration, 110 g., recrystallized from a mixture of methanol and acetone and found to melt at 214°–215° C.

*Analysis.*—Calc'd for $C_{18}H_{21}B_rN_2O_2$: C, 57.30; H, 5.61. Found: C, 57.5; H, 5.76.

A solution of 4-morpholinocarbonyl-1-β-phenethyl-piperidinium bromide (0.2 mole, 75 g.) in 200 ml. warm water was hydrogenated overnight at 58 lbs./in.$^2$ and 50° C. in the presence of 0.4 g. $PtO_2$ catalyst. After removal of the catalyst by filtration while hot, the filtrate was cooled. The product 4 - (4 - morpholinocarbonyl) - 1 - β - phenethyl - piperidine hydrobromide, crystallized out and was collected by filtration and recrystallized from methanol, M. P. 279°–280° C.

*Analysis.*—Calc'd for $C_{18}H_{26}N_2O_2$. $HB_r$: C, 56.40; H, 7.10. Found: C, 56.8, 56.4; H, 7.69, 7.20.

The free base is obtained from this salt by addition of one equivalent of sodium hydroxide to a solution of the salt in warm methanol.

EXAMPLE 8

*2-γ-pipecolino-carbonyl-1-β-phenethylpiperidine*

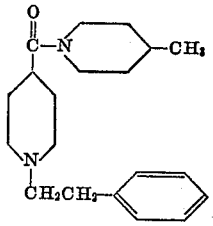

This compound is prepared by using γ-pipecoline (160 g.) in place of the morpholine of Example 7.

EXAMPLE 9

*3-(1-pyrrolidinocarbonyl)-1-β-phenethylpiperidine*

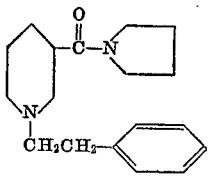

1-nicotinoylpyrrolidine, B. P. 132° C./0.3 mm; $n_D^{24.5°}$ 1.5612, was prepared according to the procedure set forth in the first paragraph of Example 1, using nicotinic acid (0.8 mole, 100 g.), methylene chloride (2 l.), triethylamine (80.8 g.), ethyl chlorocarbonate (84 ml.) and pyrrolidine (0.8 mole, 56.8 g.)

A solution of 3-pyrrolidinocarbonyl-pyridine, also called 1-nicotinoylpyrrolidine, (0.283 mole, 50 g.) and β-phenethyl bromide (0.3 mole, 56 g.) in 100 ml. acetonitrile was refluxed for 20 hours and cooled. The addition of ether precipitated the product as an oil which failed to crystallize. The solvents were removed by distillation in vacuo and the residual oil, 3-(1-pyrrolidinocarbonyl)-1-β-phenethylpiperidinium bromide, was dissolved in 150 ml. water and hydrogenated at 56.5 lbs./in.$^2$ in the presence of $PtO_2$ catalyst over 24 hours. The catalyst was removed by filtration and the filtrate containing 3-(1-pyrrolidinocarbonyl) - 1 - β - phenethyl - piperidine hydrobromide was neutralized with concentrated aqueous sodium hydroxide and extracted into ether. The ether layer was separated, dried over anhydrous potassium carbonate and the ether removed by distillation. Distillation of the residual oil gave 50 g. of 1-(1-β-phenethylnipecotyl) - pyrrolidine, also called 3 - (1 - pyrrolidino - carbonyl) - 1 - β - phenethylpiperidine, B. P. 181°–183° C./0.1 mm. A center cut was collected at 182° C./0.1 mm., $n_D^{28°}$ 1.5431.

*Analysis.*—Calc'd for $C_{18}H_{26}N_2O$: C, 75.48; H, 9.15. Found: C, 75.7; H, 9.13.

EXAMPLE 10

*4-(1-pyrrolidinocarbonyl)-1-β-phenethylpiperidine*

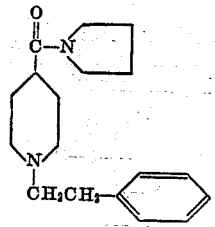

This product is prepared as the hydrobromide and as the free base by carrying out the procedures of Example 9 except that the nicotinic acid of Example 9 is replaced by 100 g. isonicotinic acid.

EXAMPLE 11

*2-(1-pyrrolidinocarbonyl)-1-β-phenethylpiperidine*

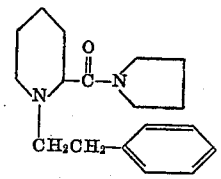

This free base is prepared by following the procedure of Example 9 using 2-pyridinecarboxylic acid (100 g.) in place of the nicotinic acid.

EXAMPLE 12

*4-[4-(2,6-dimethylmorpholino)carbonyl]-β-phenethylpiperidine*

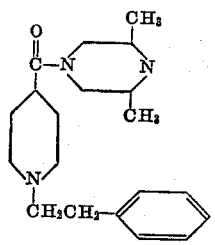

Isonicotinic acid (1 mole, 123 g.), 2,6-dimethylmorpholine (1.05 mole, 121 g.), triethylamine (1.05 mole, 106 g.), ethyl chloroformate (2.2 mole, 210 ml.) and methylene chloride (4 l.) were reacted according to the procedure of Example 1. The product, 2,6-dimethyl-4-isonicotinoylmorpholine, was isolated, dried and distilled, B. P. 135°–137°/0.3 mm., 110 g.

*Analysis.*—Calc'd for $C_{12}H_{16}N_2O_2$: C, 65.43; H, 7.32. Found: C, 64.9; H, 6.88.

A solution of 2,6-dimethyl-4-isonicotinoylmorpholine (0.2 mole, 44 g.) and β-phenethyl bromide (0.2 mole, 37 g.) in 100 ml. acetonitrile was heated under reflux on the steam bath for about 20 hours to form the quarternary salt, 4-[4-(2,6-dimethylmorpholino)carbonyl]-1-β-phenethylpiperidinium bromide which was collected by filtration (76 g.) and recrystallized from methanol-ether, M. P. 227°–228° C.

*Analysis.*—Calc'd for $C_{20}H_{25}BrN_2O_2$: C, 59.12; H, 6.20. Found: C, 59.2; N, 6.17.

A solution of 50 g. (0.123 mole) of the quarternary salt in 200 ml. water was hydrogenated at 60 lbs./in.$^2$ in the presence of 0.5 g. $PtO_2$ catalyst at about 50° C. Reduction was allowed to proceed overnight. After 18 hours, the catalyst was removed by filtration while hot. The 2,6-dimethyl-4-(1-β-phenethylisonipecotoyl)-morpholine hydrobromide, which may also be called 4-[4-(2,6-dimethylmorpholino)carbonyl]-1-β-phenethylpiperidine hydrobromide, precipitated on cooling and was collected by filtration, 40 g., M. P. 252°–254° C.

Analysis.—Calc'd for $C_{20}H_{32}N_2O_2 \cdot HBr$: C, 58.10; H, 8.05. Found: C, 58.1; H, 7.85.

This salt is converted to the free base by shaking it in aqueous sodium hydroxide.

I claim:
1. A compound selected from the group consisting of a free base and non-toxic acid addition salts thereof, said free base having the formula

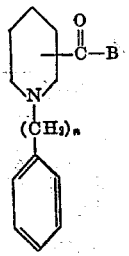

wherein $n$ is an integer from to three inclusive and B is a member selected from the group consisting of morpholino, 2,6-dimethyl-morpholino, piperidino, pipecolino and pyrrolidino.

2. 4-(4-morpholinocarbonyl-1-β-phenethylpiperidine.
3. 3-(4-morpholinocarbonyl)-1-β-phenethylpiperdine.
4. 2-(4-morpholinocarbonyl)-1-β-phenethylpiperidine.
5. 3-(1-pyrrolidinocarbonyl)-1-β-phenethylpiperidine.
6. 3-(1-piperidinocarbonyl)-1-β-phenethylpiperidine.

References Cited in the file of this patent
UNITED STATES PATENTS

| | | |
|---|---|---|
| 2,188,244 | Langlais et al. | Jan. 23, 1940 |
| 2,684,965 | Wastan et al. | July 27, 1954 |